United States Patent
Thompson et al.

(10) Patent No.: US 7,469,771 B2
(45) Date of Patent: Dec. 30, 2008

(54) HIGH DIRECTIONAL AND KIT FOR A HIGH DIRECTIONAL

(75) Inventors: Rocke P. Thompson, Clearfield, UT (US); Reed B. Thorne, Sedona, AZ (US)

(73) Assignee: Techxotic LC, Clearfield, UT (US)

(*) Notice: Subject to any disclaimer, the term of this patent is extended or adjusted under 35 U.S.C. 154(b) by 401 days.

(21) Appl. No.: 10/977,319

(22) Filed: Oct. 29, 2004

(65) Prior Publication Data
US 2006/0102426 A1    May 18, 2006

(51) Int. Cl.
*F16M 11/38* (2006.01)

(52) U.S. Cl. .......... 182/186.7; 182/186.8; 182/187; 182/225; 248/163.2; 248/170; 248/188.5; 248/188.6; 248/177.1

(58) Field of Classification Search .......... 182/186.7, 182/186.8, 224, 225, 187; 248/163.2, 168, 248/169, 173, 178.1, 185.1, 440.1, 188.5, 248/188.6, 188.9, 170, 177.1; 403/169, 170, 403/267
See application file for complete search history.

(56) References Cited

U.S. PATENT DOCUMENTS

| | | | | |
|---|---|---|---|---|
| 230,935 | A | * | 8/1880 | Githens ............... 248/168 |
| 3,175,642 | A | * | 3/1965 | Neeley ............... 182/224 |
| 4,015,806 | A | | 4/1977 | Cattermole |
| 4,453,686 | A | * | 6/1984 | Ina ............... 248/168 |
| 4,589,523 | A | | 5/1986 | Olson et al. |
| 4,699,248 | A | * | 10/1987 | Roy ............... 182/187 |
| 4,767,090 | A | * | 8/1988 | Hartman et al. ............ 248/168 |
| 4,997,152 | A | * | 3/1991 | Wagman et al. ............ 248/168 |
| 5,498,096 | A | * | 3/1996 | Johnson ............ 403/267 |
| 5,613,658 | A | | 3/1997 | Rogelja |
| 5,685,395 | A | * | 11/1997 | Nelson ............ 182/187 |
| 7,048,241 | B2 | * | 5/2006 | Crain et al. ............ 248/170 |

* cited by examiner

*Primary Examiner*—Richard E. Chilcot, Jr.
*Assistant Examiner*—Matthew J Smith
(74) *Attorney, Agent, or Firm*—TraskBritt

(57) ABSTRACT

Various embodiments for high directionals and kits for high directionals are disclosed. A high directional having an articulated, separable head is disclosed. A high directional having a height adjustable both by altering the length of the legs and by adjusting the leg connection to the head is disclosed. A kit for a high directional including a head, legs, and multiple sets of feet for the high directional is disclosed. The feet of each set are configured for different surfaces. Another kit for a high directional includes a first head component, a second head component, and a plurality of legs.

34 Claims, 10 Drawing Sheets

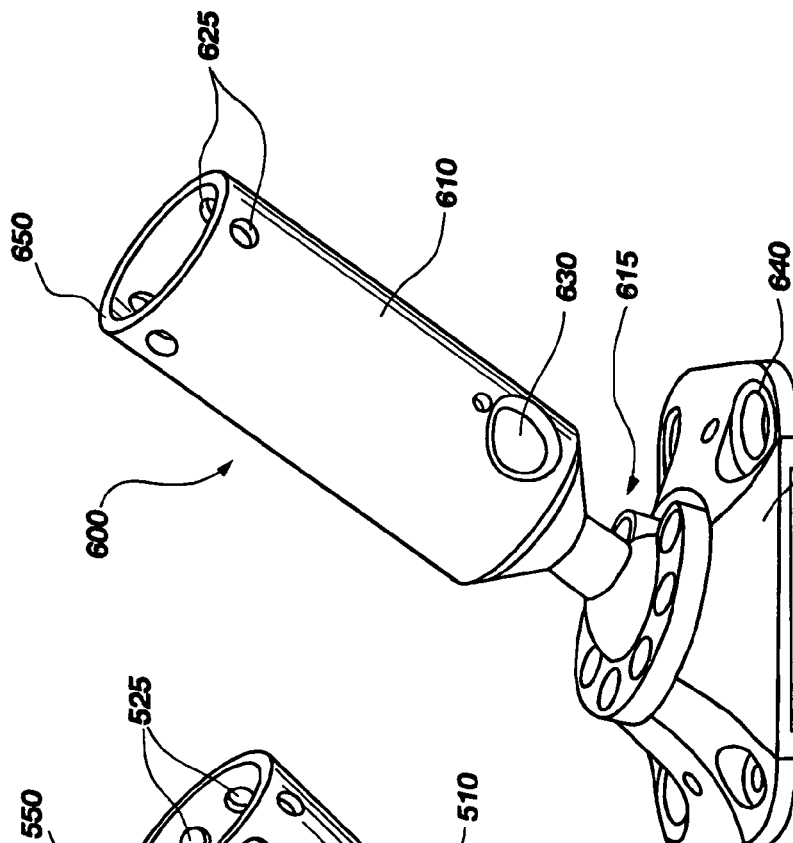
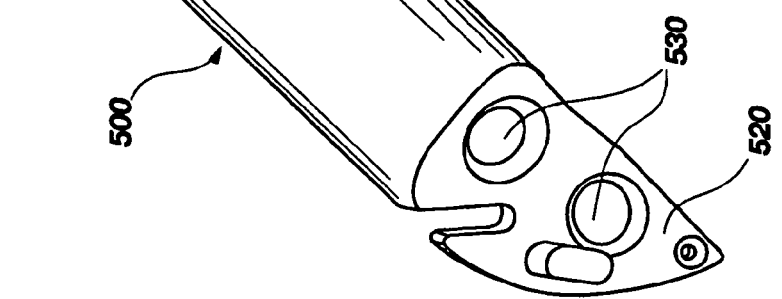
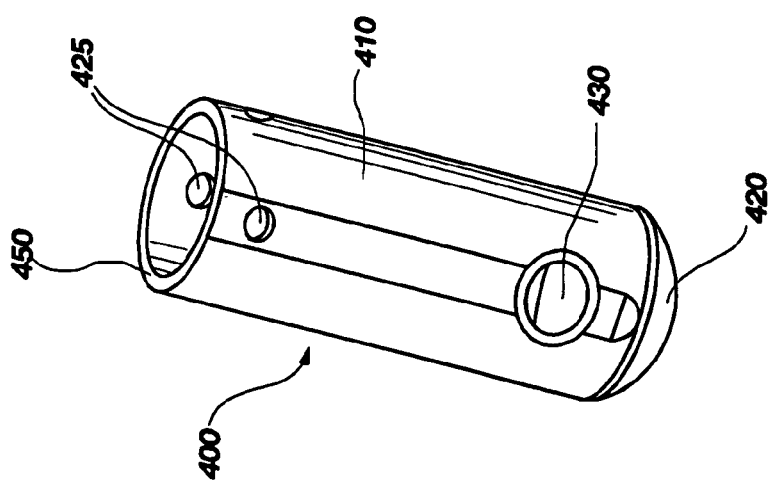
FIG. 7C
FIG. 7B
FIG. 7A

HIGH DIRECTIONAL AND KIT FOR A HIGH DIRECTIONAL

BACKGROUND OF THE INVENTION

1. Field of the Invention

The present invention relates to an improved high directional and a kit for a high directional. More particularly, the present invention relates to a multipod, for example, a tripod, or a quadpod, as vertical rigging equipment.

2. State of the Art

Tripods are used as artificial high directionals and anchors in rigging activities, for example mountain and industrial rescue work, and confined space entry. A conventional industrial tripod has three legs permanently secured to a head. The head may include rigging anchors having holes for attachment points. Devices such as pulleys may be attached to the holes using carabiners. Generally, a carabiner has a ring or C-shaped body having a gate which may be opened or closed.

A directional is used in rigging activities which employ ropes. The directional may change the direction a rope is positioned, or running. Often, in rigging activities, the rope is weighted, and the directional must have load bearing capacity, referred to as an anchor. A "natural" anchor, such as a tree, may not be positioned to provide an efficient attachment point for ropes during a rescue. An "artificial" anchor, such as a tripod, may serve as a directional anchor, allowing the ropes to be efficiently employed.

In a confined space rescue, illustrated in FIG. 1, a conventional tripod 10 having three legs 20 attached at their proximal end by a head 15 may used. The three legs 20 may be connected at their distal ends with a safety chain 30 to prevent leg slippage, and be positioned over the confined space, in this case a manhole 40 containing a victim. A rope 50 extends from the manhole 40, where the rope 50 is secured to the victim. The rope 50 reaches from the hole to a pulley 60 affixed to the tripod 10. The rope 50 may be pulled through the pulley 60 by the efforts of rescuers on the surface, pulling the victim from the manhole 40. The tripod 10 provides a high directional anchor for the pulley 60 and therefore the rope 50, allowing the victim to be removed from the manhole 40 with minimal friction. The conventional tripod described has limited attachment points, and only provides a directional anchor point directly above the footprint of the legs of the tripod.

Accordingly, there is a need for an artificial high directional anchor device capable of providing a directional anchor point both away from the leg or legs of the device, and directly above the leg or legs of the device.

BRIEF SUMMARY OF THE INVENTION

The present invention, in a number of embodiments, includes a high directional as well as a kit for a high directional.

In an exemplary embodiment, a high directional is disclosed. The high directional may have an articulated head, including a first head component removably coupled with a second head component, and the first head component movable with respect to the second head component. The high directional further includes a plurality of legs, at least one leg of the plurality of legs removably connected to the first head component, at least another leg removably connected to the second head component.

In another exemplary embodiment, a high directional may have a head configured for supporting an object, and a plurality of legs removably connected to the head. Each leg may have an upper leg segment telescopically received in and axially movable through the head. A lower leg segment is configured for telescopically receiving the upper leg segment, and the upper leg segment is axially adjustable with respect to the lower leg segment. Additional lower leg segments may be connected to the lower leg segment.

In another exemplary embodiment, a high directional comprises a head for supporting an object, a plurality of legs connected to the head, and a retaining pin removably coupled to the head to provide a point of attachment for a device for supporting the object.

In yet another exemplary embodiment, a kit for a high directional comprises a first head component; a second head component configured to be coupled to and rotatable about the first head component; and a plurality of legs, at least one leg of the plurality of legs configured to be coupled with the first head component, and at least another leg of the plurality of legs configured to be connected to the second head component.

Another kit for a high directional comprises a head having a plurality of leg connectors, a plurality of legs, and a plurality of feet. Each leg comprises an upper leg segment configured to be coupled with a leg connector of the plurality of leg connectors and a lower leg segment configured to be telescopically coupled with the upper leg segment. The plurality of feet includes a set of feet configured for use with a variety of surfaces, and a set of feet configured for use with soft surfaces.

Yet another kit for a high directional includes a plurality of legs, a first head component configured to be connected to at least one leg of the plurality of legs for use in a multipod and configured for use in a gin pole, and a second head component configured to be coupled to the first head component and connected to at least another leg of the plurality of legs for use in a multipod and configured for use in an A-frame.

These features, advantages, and alternative aspects of the present invention will be apparent to those skilled in the art from a consideration of the following detailed description taken in combination with the accompanying drawings.

BRIEF DESCRIPTION OF THE SEVERAL VIEWS OF THE DRAWINGS

In the drawings, which illustrate what is currently considered to be the best mode for carrying out the invention:

FIGS. 7A-7C illustrate various feet of a high directional of the present invention;

DETAILED DESCRIPTION OF THE INVENTION

Figure 10:
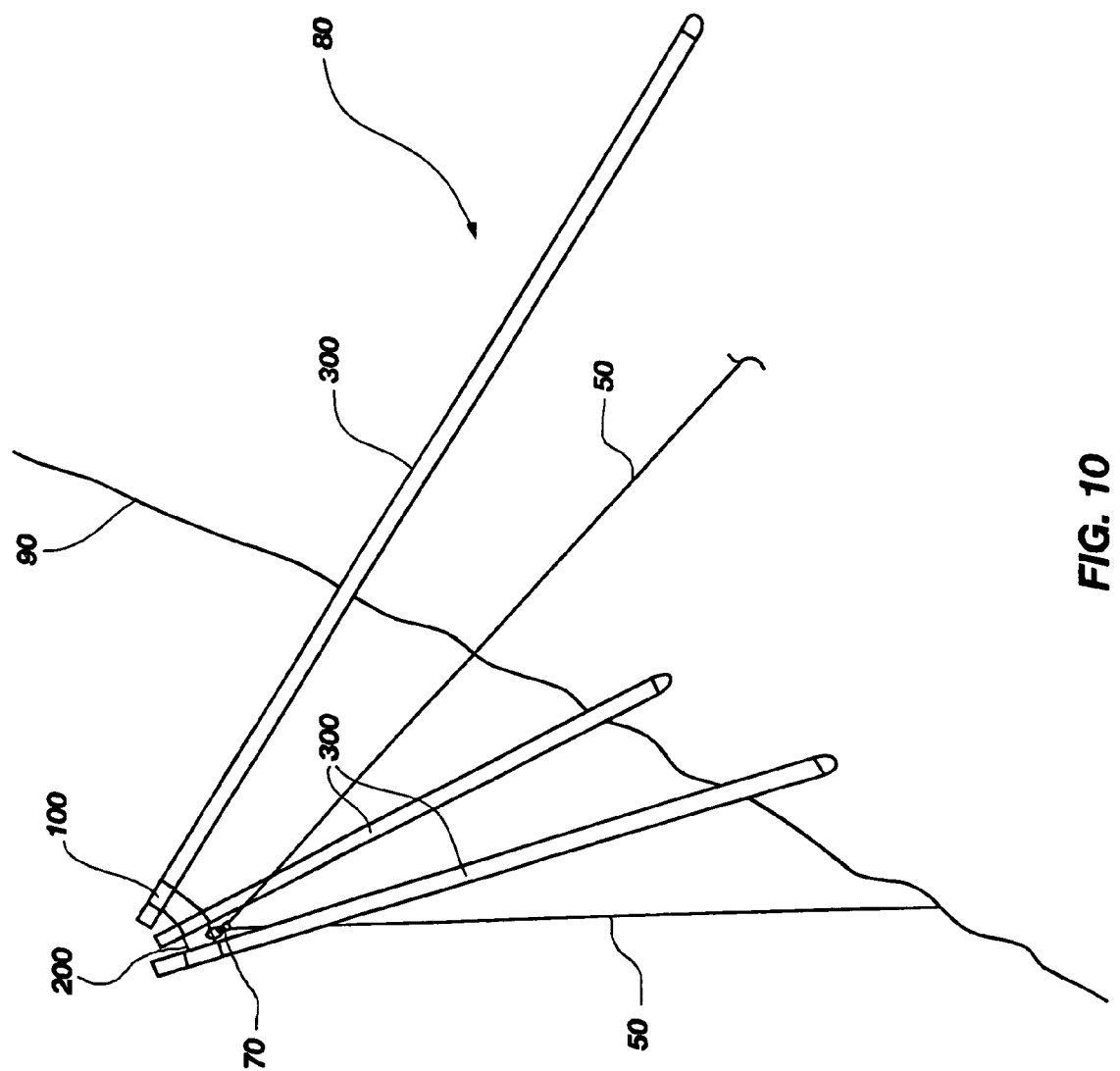
FIG. 10 illustrates a high directional of the present invention.

The present invention, in a number of embodiments, includes a device in the form of a high directional. As shown in FIG. 10, the high directional 80 may include an articulated, separable head 100 coupled with a plurality of legs 300, enabling the high directional 80 to be adapted to uneven terrain and to be cantilevered over an edge 90, providing a high anchor point 70. The edge 90 may be, for example, a cliff face, or the edge of a building. The high anchor point 70 may be positioned above, and outward from, the edge 90, and give low-friction access for a rope 50 below the edge 90. The high anchor point 70 thus provides a directional anchor over a space outside of the footprint of the high directional 80. In use, the high directional 80 may be temporarily or permanently anchored or secured to the terrain using, for example, rope, webbing, bolts, and chain. The high directional 80 may be portable, including separable components which may be disassembled to transport the high directional 80. In the detailed description which follows, like features and elements are identified in the drawings with the same or similar reference numerals for the convenience of the reader.

Figure 1:
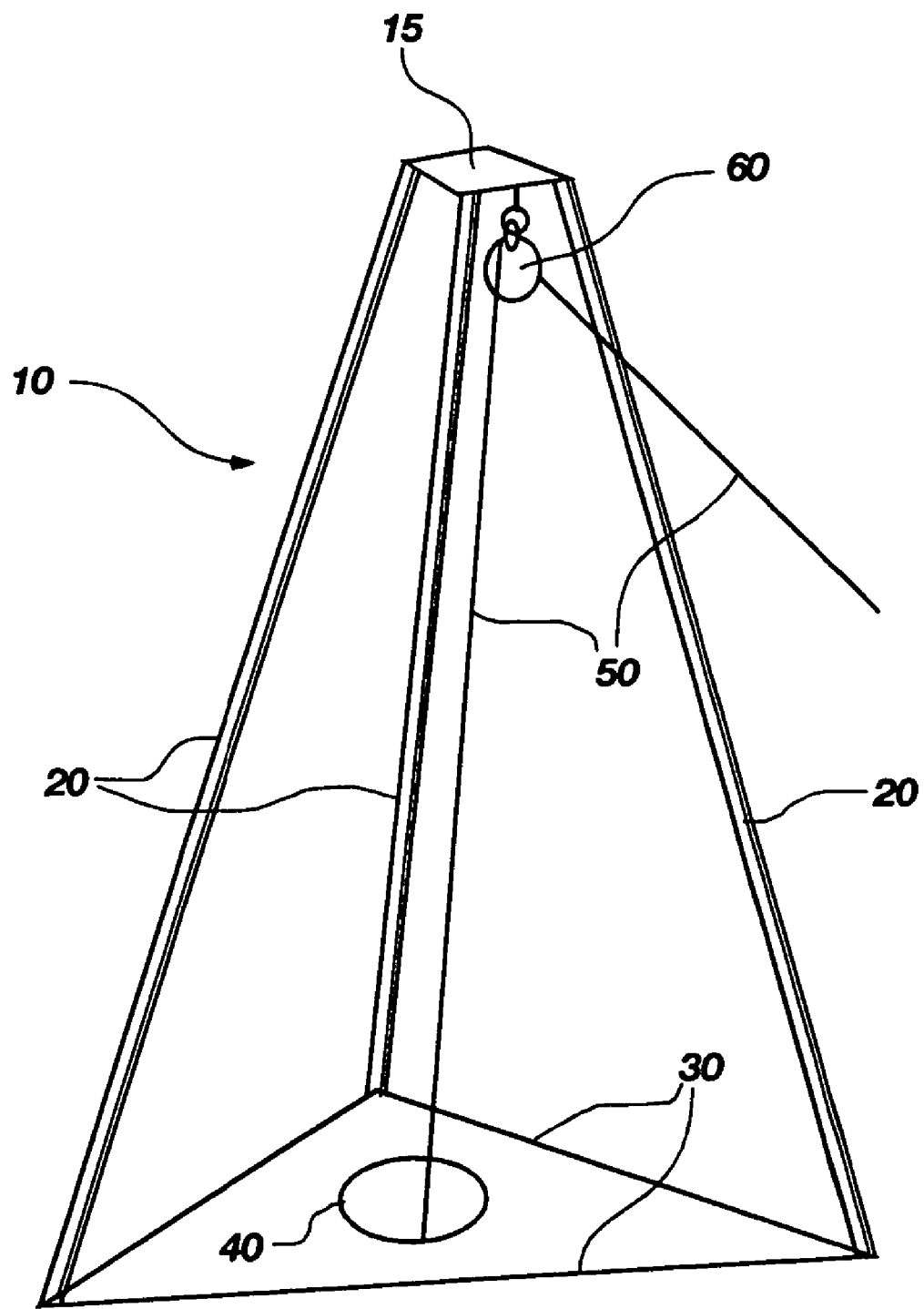
FIG. 1 illustrates a conventional tripod.
Figure 2:
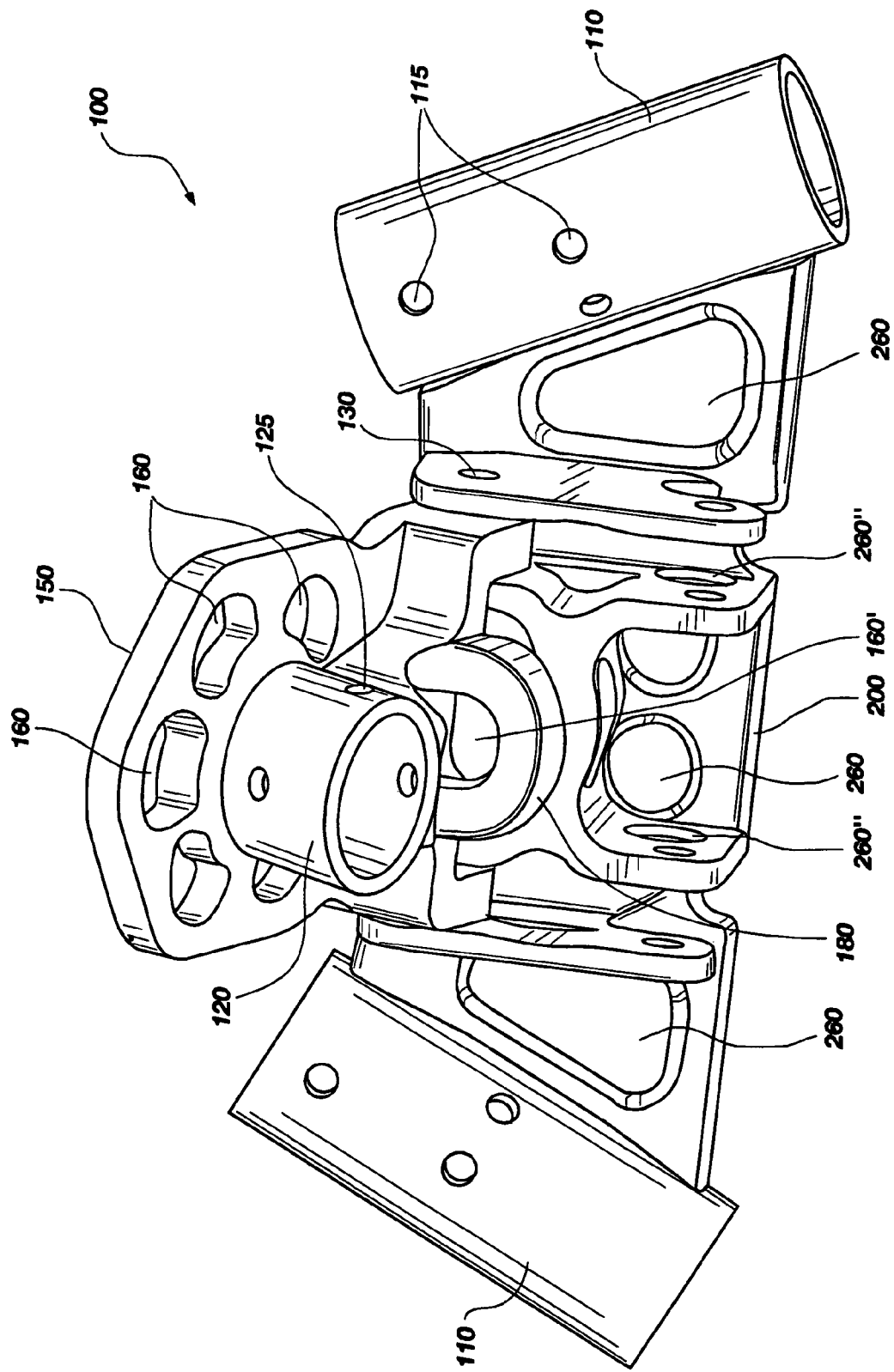
FIG. 2 illustrates one embodiment of a head of a high directional of the present invention.
Figure 3:
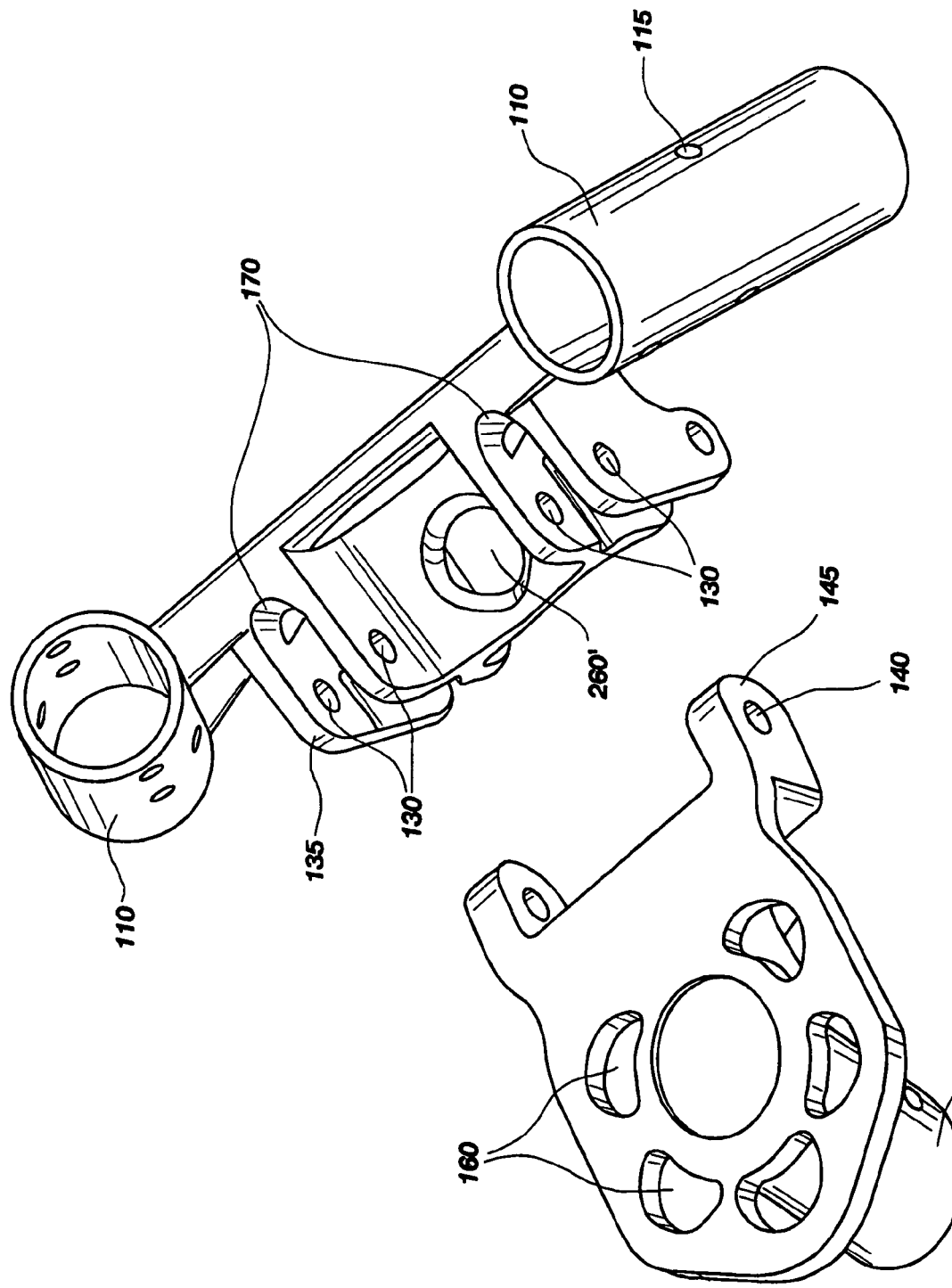
FIG. 3 illustrates another view of the head of FIG. 2.

An exemplary embodiment of an articulated, separable head 100 of the present invention is depicted in FIG. 2. The head 100 comprises a first head component 200 and a second head component 150. Each head component 150, 200 may be formed from a variety of metals and alloys, such as aluminum alloys and steel. Each head component 150, 200 may be milled from a solid block of material; alternatively, each head component 150, 200 may be cast or the components may be joined using welding or epoxy. The first head component 200 may be affixed to the second head component 150 in a jointed manner. In an exemplary embodiment, the second head component 150 may include protrusions 145, as shown in FIG. 3. Each protrusion 145 includes an aperture 140 formed therethrough. The first head component 200 includes hinge guides 135 including apertures 130 therethrough. The first head component 200 may be affixed to the second head component 150 using retention pins 151 extending through the apertures 130 of the hinge guide 135 and the aperture 140 of the protrusions 145. The first head component 200 and the second head component 150 are rotatable with respect to one another, about an axis extending through the apertures 130, 140. The first head component 200 and the second head component 150 thus form an articulated tripod head 100. The retention pins of the high directional may each be configured to be secured with a cotter pin, spring loaded projections, or other conventional techniques. Optionally, a screw or rivet may be used to permanently connect the first head component 200 and the second head component 150.

The first head component 200 and the second head component 150 are rotatable with respect to one another, about retaining pins 151 within apertures 130, 140. The extent of the rotation may be restricted by stops 170 on the first head component 200 (FIG. 3) in one direction, and stop 180 on the first head component 200 (FIG. 2) in the opposing direction. The stops 170, 180 may prevent the legs from accidentally inverting or falling together.

With continued reference to FIGS. 2 and 3, the first head component 200 includes leg connectors 110. Each leg connector 110 is tubular, and may include one or more apertures 115 for secure connection of a leg using retention pins (not shown), as explained in more detail hereinbelow. At least two of the plurality of apertures 115 may be positioned at the endpoints of a diameter of a cross-section of the leg connector 110, providing a conduit for the retention pin. The first head component 200 also includes a plurality of openings 260 providing points of attachment for ropes, carabiners, and other equipment for use with the high directional. Some of the openings 260 may be positioned such that the points of attachment are provided in different planes, described in greater detail hereinbelow. At least one opening of the plurality of openings 260 may be positioned to provide a point of attachment offset from the planes of the leg connectors 110, 120 so that a rope connected to the point of attachment may pass the legs of the tripod without rubbing. Opening 260', as shown in FIG. 3 is one example of an offset point of attachment. Opening 160' of the second head component 150, as shown in FIG. 2 is another example.

Figure 11:
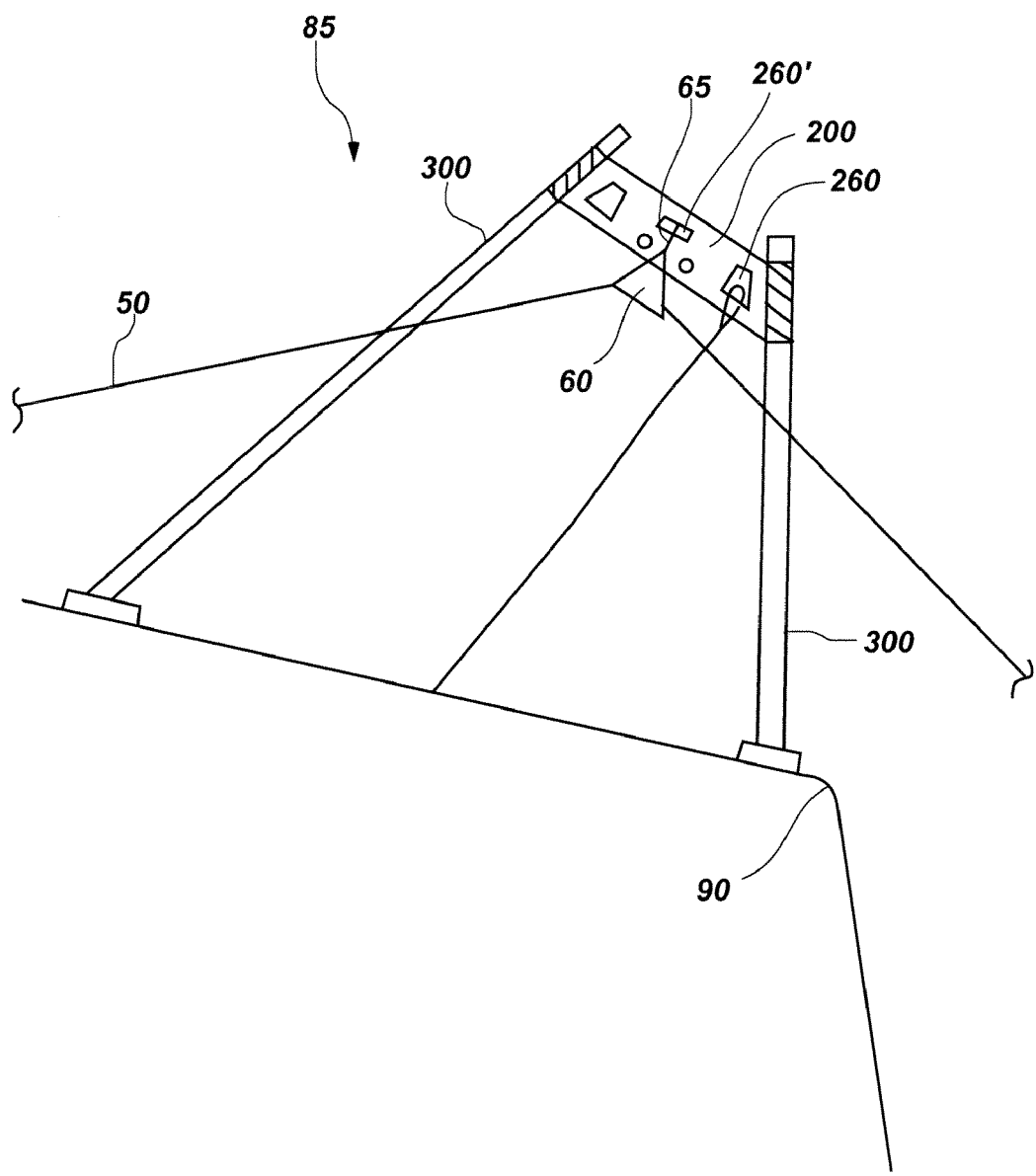
FIG. 11 illustrates a high directional of the present invention used in a sideways A-frame configuration.

FIG. 11 depicts the first head component 200 used with two legs 300 in a sideways A-frame configuration. With this configuration, the plane of the high directional 85 is substantially perpendicular to the edge 90, and the plane of the rope 50 is substantially parallel to the plane of the high directional 85. The rope 50 runs through a pulley 60, attached using a carabiner 65 with the opening 260' of the first head component 200. The rope 50 may pass by the legs 300 without rubbing because the opening 260' is an offset point of attachment.

Figure 9:
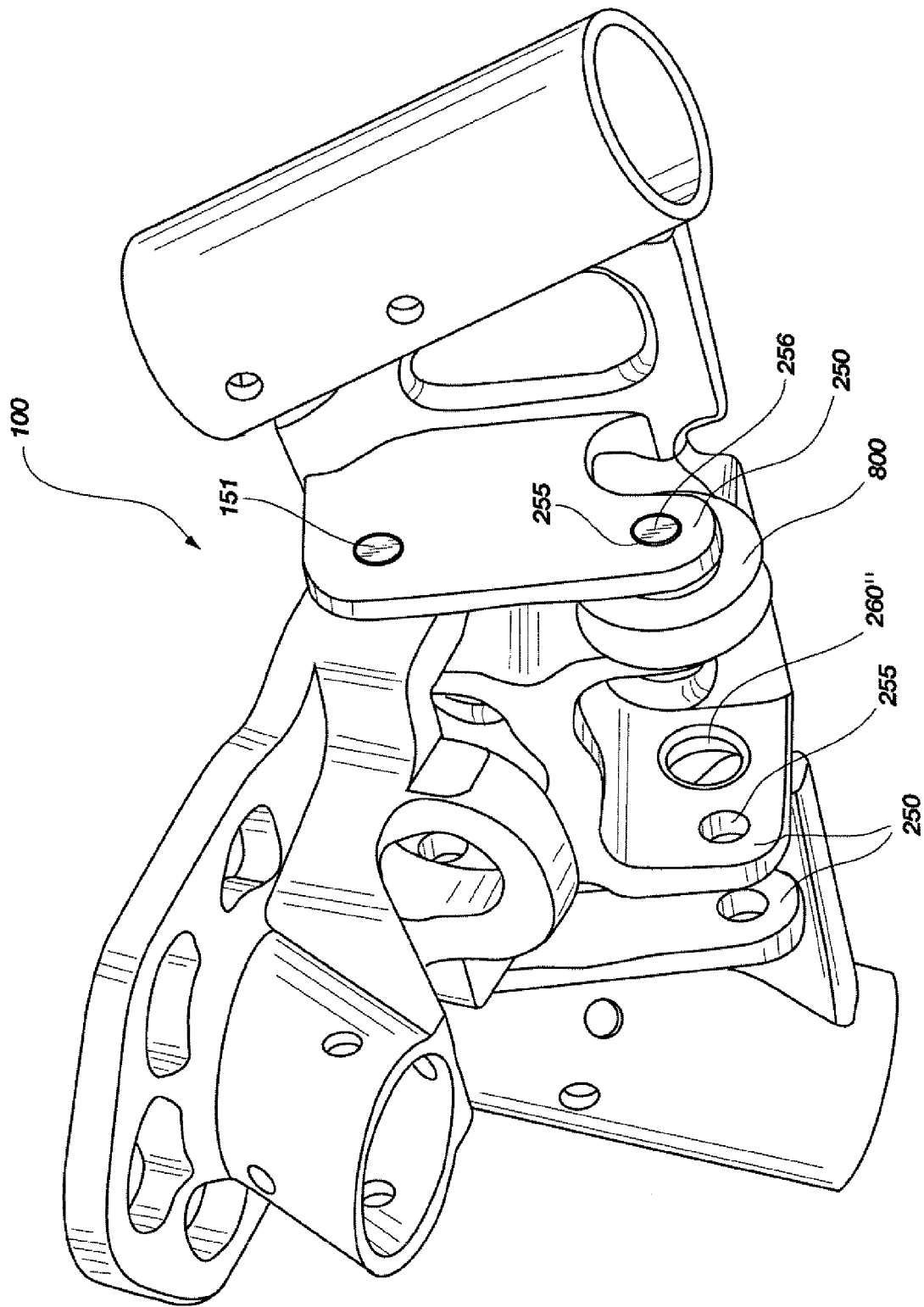
FIG. 9 illustrates the head of FIG. 2 coupled with a pulley wheel.

Another feature of the head 100 of the present invention allows a pulley 60 or other device to be attached and oriented in two different planes. Openings 260'', clearly illustrated in FIGS. 2 and 9, are positioned on flanges 250. The flanges 250 are positioned substantially perpendicularly from the plane of the openings 260 of the first head component 200. A conventional pulley 60 attached to opening 260, 260' with a carabiner 65 guides a rope 50 in a direction parallel to the plane of legs 300 joined to the first head component 200, as shown in the sideways A-frame configuration of FIG. 11. A conventional pulley 60 attached to the opening 260'' with a carabiner 65 will guide the rope 50 in a direction perpendicular to the plane of legs 300 joined to the first head component 200. FIG. 10 depicts a rope 50 positioned in a direction perpendicular to the plane of legs 300 joined to the first head component 200. The two legs 300 closest to the edge 90 are the legs 300 joined to the first head component 200.

With continued reference to FIGS. 2 and 3, the second head component 150 includes at least one leg connector 120. The leg connector 120 is tubular, and may include a plurality of apertures 125 for secure connection of the legs using leg retention pins. At least two of the plurality of apertures may be positioned at opposing endpoints of a diameter of a circumferential cross-section of the leg connector 120, providing a conduit for the retention pin. The second head component 150 also includes a plurality of openings 160 providing points of attachment for ropes, carabiners, and other equipment used in rigging activities. The openings 160, 260 may be sized to accommodate a single rope or carabiner, or may be large enough to accommodate a plurality of carabiners attached to a single opening 160, 260.

The head 100 shown in FIGS. 2 and 3 includes three leg connectors 110, 120, and therefore is a head for a high directional in the form of a tripod. A head having additional leg connectors, for example, a head for a quadpod, having four leg connectors, is also within the scope of the present invention.

The head 100, as shown in FIGS. 2 and 3 is separable, allowing the first head component 200 to be used independently as an A-frame set-up, a high directional having two legs. The second head component 150 may also be used independently as a gin pole, a high directional having only one leg. The second head component 150 may alternatively include two leg connectors 110, and the first head component 200 and the second head component 150 may be combined with four legs to create a quadpod high directional.

Figure 4:
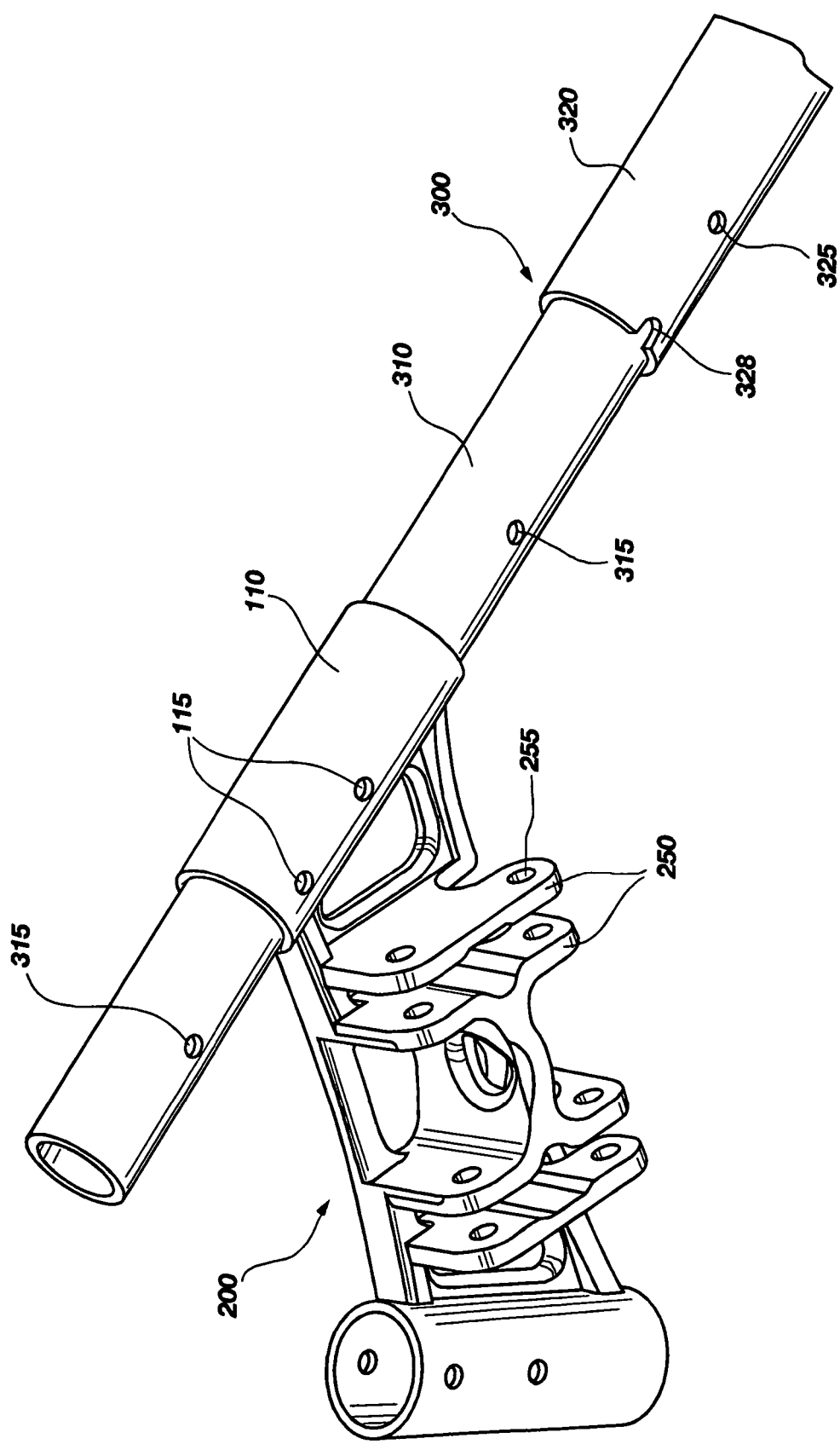
FIG. 4 illustrates a portion of a high directional of the present invention.

FIG. 4 shows a leg 300 connected to the first head component 200. Each leg 300 may include an upper leg segment 310 and at least one lower leg segment 320. A high directional including non-segmented legs is also within the scope of this invention. The leg 300 is shown as tubular, with a circular cross-section; however, the leg 300 could have a cross-section of any shape, including by way of example and not limitation, triangular, elliptical, or quadrilateral. The leg connectors 110, 120 may have a substantially similar cross-sectional shape, or any cross-sectional shape allowing the upper leg segment 310 to be axially movable therethrough. The upper leg segment 310 is shown as tubular, with a hollow interior; however, the upper leg segment 310 may be solid.

The upper leg segment 310 is axially movable through the leg connector 110, 120. The position of the upper leg segment 310 relative to the leg connector 110, 120 affects the overall height of the high directional. The upper leg segment 310 includes a plurality of apertures 315. At least two of the plurality of apertures 315 may be positioned in a pair at opposing endpoints of a diameter of a circumferential cross-section of the upper leg segment 310, providing a conduit for a leg retention pin joining the upper leg segment 310 with the leg connector 110, 120. The apertures 315 may be positioned at axially spaced apart locations along the upper leg segment 310, providing a plurality of connection positions, and therefore height adjustment options for the high directional. The plurality of apertures 115 of the leg connector 110 may additionally be axially spaced apart. The spacing of the apertures 315 of the upper leg segment 310 may be different than the spacing of the apertures 115 of the leg connector, providing additional connection positions, and therefore additional height adjustment options. The upper leg segment 310 may be joined to the leg connector 110 by the leg retention pin through aligned apertures 315, 115. The plurality of apertures 115 of the leg connector 110 may include multiple apertures on a circumference of the leg connector 110, providing ease of alignment.

The upper leg segment 310 may telescope into the lower leg segment 320, as shown in FIG. 4. Alternatively, the lower leg segment may be of a lesser cross-sectional diameter, and telescope into the upper leg segment. The upper leg segment 310 may be axially movable with respect to the lower leg segment 320, providing an adjustment of the length of the leg 300, and therefore another height adjustment option for the high directional. The upper leg segment 310 may be secured to the lower leg segment 320 using a leg retention pin (not shown) through any of the apertures 315 of the upper leg segment 310 and the apertures 325 of the lower leg segment 320.

Figure 5A:
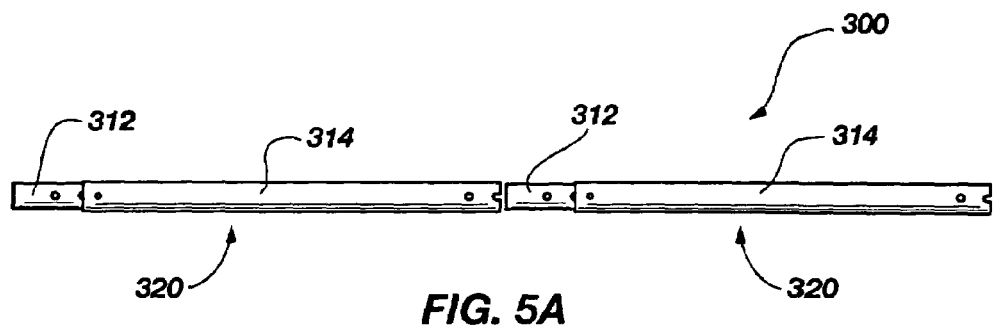
FIGS. 5A-5B illustrate a portion of a leg of a high directional of the present invention.
Figure 5B:
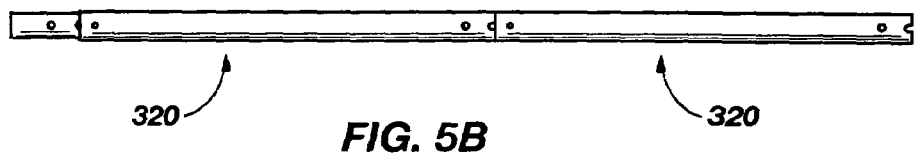

The length of the leg 300 may be increased by using additional lower leg segments 320. The lower leg segments 320 may be configured to be interconnected as shown in FIGS. 5A-5B and 6A-6B. Each lower leg segment 320 may include an outer leg portion 314 and an inner leg portion 312 of a lesser outer diameter secured partially therein and extending axially therefrom. The inner leg portion 312 may be secured with an epoxy, a weld, a screw, or a rivet. Use of an epoxy will not soften the metal, which may occur when a weld is used. A screw 318 (FIG. 6A) may be used to precisely align and join the inner leg portion 312 and the outer leg portion 314 during assembly and epoxy cure time. The screw 318 may provide some strength in the event of bad or missing epoxy. FIG. 5B illustrates two interconnected lower leg segments 320.

Figure 6A:
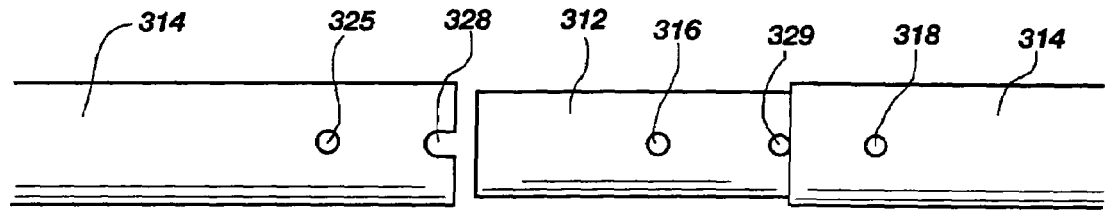
FIGS. 6A-6B illustrate another view of the portion of the leg of FIGS. 5A-5B.
Figure 6B:
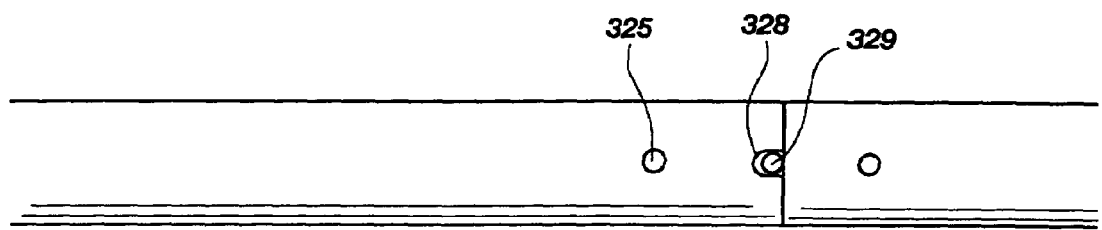

FIGS. 6A and 6B show close-up views of the interconnection between the two lower leg segments 320. In FIG. 6A the lower leg segments 320 are separated, and apertures 316 through the inner leg portion 312 providing a conduit for a retention pin may be viewed. Apertures 325 pass through the outer leg portion 314, also providing a conduit for the retention pin. The outer leg portion 314 includes a locating notch 328, configured to accommodate a locating projection 329 of the inner leg portion 312. The locating notch 328 and the locating projection 329 are positioned on the outer leg portion 314 and the inner leg portion 312, respectively, such that when the locating notch 328 and the locating projection 329 are coupled, the apertures 316, 325 through the inner leg portion 312 and outer leg portion 314, respectively, are aligned, providing a single, continuous conduit for the retention pin. The locating notch 328 and the locating projection 329 provide a non-visual cue for aperture alignment. This may be very important in a crisis situation or in the dark.

The high directional of the present invention thus provides a variety of height adjustment options, including: the adjustment of the upper leg segment 310 through the leg connector 110, 120 of the head 100; the adjustment of the upper leg segment 310 telescoping within the lower leg segment 320; and supplementing of the overall leg length with additional lower leg segments. This variety of height adjustment options provides a high directional configured to adapt to the countless situations and the diverse range of terrain a rescue team may encounter.

FIGS. 7A-7C depict different feet that may be secured to the high directional. The round foot 400, shown in FIG. 7A, may be used on a variety of surfaces. The round foot 400 includes a body 410 and an endcap 420. The body 410 may be aluminum, or another other material, such as those suitable for the legs 300 of the high directional. In one embodiment, the endcap 420 is stainless steel, but the endcap 420 may comprise any material. The body 410 is sized and configured to mate with and engage the inner leg portion 312 of a lower leg segment 320 to provide a stable support for each leg 300. The body 410 may include a pair of diametrically-opposed apertures 425 positioned to provide a single, continuous conduit for a foot retention pin through the apertures 316 of the inner leg portion 312 and the pair of apertures 425 of the body 410. The body 410 may additionally include rigging apertures 430 therethrough to provide points of attachment for carabiners, ropes, webbing, or chain for securely rigging the round foot 400 to prevent movement thereof.

FIG. 7B illustrates a raptor foot 500 for use on soft surfaces, such as soft soil common in a mine or a wilderness area. The raptor foot 500 has a body 510 sized and configured to mate with and engage the inner leg portion 312 of a lower leg segment 320, and a tip 520 configured to dig into a soft surface, and direct downward forces into the surface. The body 510 may include at least one pair of diametrically-opposing apertures 525 positioned to provide a single, continuous conduit for a foot retention pin through the apertures 316 of the inner leg portion 312 and the pair of apertures 525 of the body 510. Multiple pairs of apertures 525, as shown in FIG. 7B, enable the foot to be easily positioned on and secured to the inner leg portion 312. The raptor foot 500 may additionally include rigging apertures 530 therethrough.

FIG. 7C illustrates a jointed foot 600 for use on flat surfaces, such as floors or roofs. The jointed foot 600 has a body 610 sized and configured to mate with and engage the inner leg portion 312 of a lower leg segment 320, a base 620, and a joint 615 configured to movably couple the body 610 and the base 620. The body 610 may include at least one pair of diametrically-opposing apertures 625 positioned to provide a single, continuous conduit for a foot retention pin through the apertures 316 of the inner leg portion 312 and the pair of apertures 625 of the body 610. Multiple pairs of apertures 625, as shown in FIG. 7C, enable the jointed foot 600 to be easily positioned on and secured to the inner leg portion 312. The body 610 may additionally include rigging apertures 630 therethrough. The base 620 may include at least one aperture 640 configured to allow the base 620 to be bolted to a surface (not shown). The joint 615 is illustrated as a ball-and-socket joint, however, any type of joint is within the scope of the invention, such as a hinge or a pivot.

The diametrically-opposing apertures 425, 525, and 625 of each foot 400, 500, and 600 may be axially spaced an equal distance from a rim 450, 550, and 650 of each foot. This equal axial spacing may coincide with the axial spacing of the aperture 316 and locating projection 329 of the inner leg portion 312 or the rim 350 (not shown) of the outer leg portion 314 (see FIG. 6A). The equal axial spacing allows the diametrically-opposing apertures 425, 525, and 625 of each foot 400, 500, and 600 to be easily aligned with the aperture 316 of the inner leg portion 312. Alternatively, the axial spacing of the diametrically-opposing apertures 425, 525, and 625 may be equidistant from a stop within the body 410, 510, 610 of the foot 400, 500, 600, preventing the inner leg portion 312 from further ingress at the point of aperture alignment. This stop may comprise a taper of the foot body 410, 510, 610, or a projection therein.

Any of the feet shown in FIGS. 7A-7C may be removably fastened to the legs 300 of a high directional with foot retention pins through apertures. Optionally, feet with or without diametrically-opposing apertures 425, 525, 625 may be permanently fastened to the legs 300, for example with a weld or epoxy. A high directional may include matching feet or different feet, for example, a tripod high directional may include three raptor feet 500, or may include one round foot 400, one raptor foot 500, and one jointed foot 600. A kit for a high directional may include sets of different feet, for example, a kit may include a head 100, legs 300, and a set of raptor feet 500, and a set of round feet 400.

Figure 8:
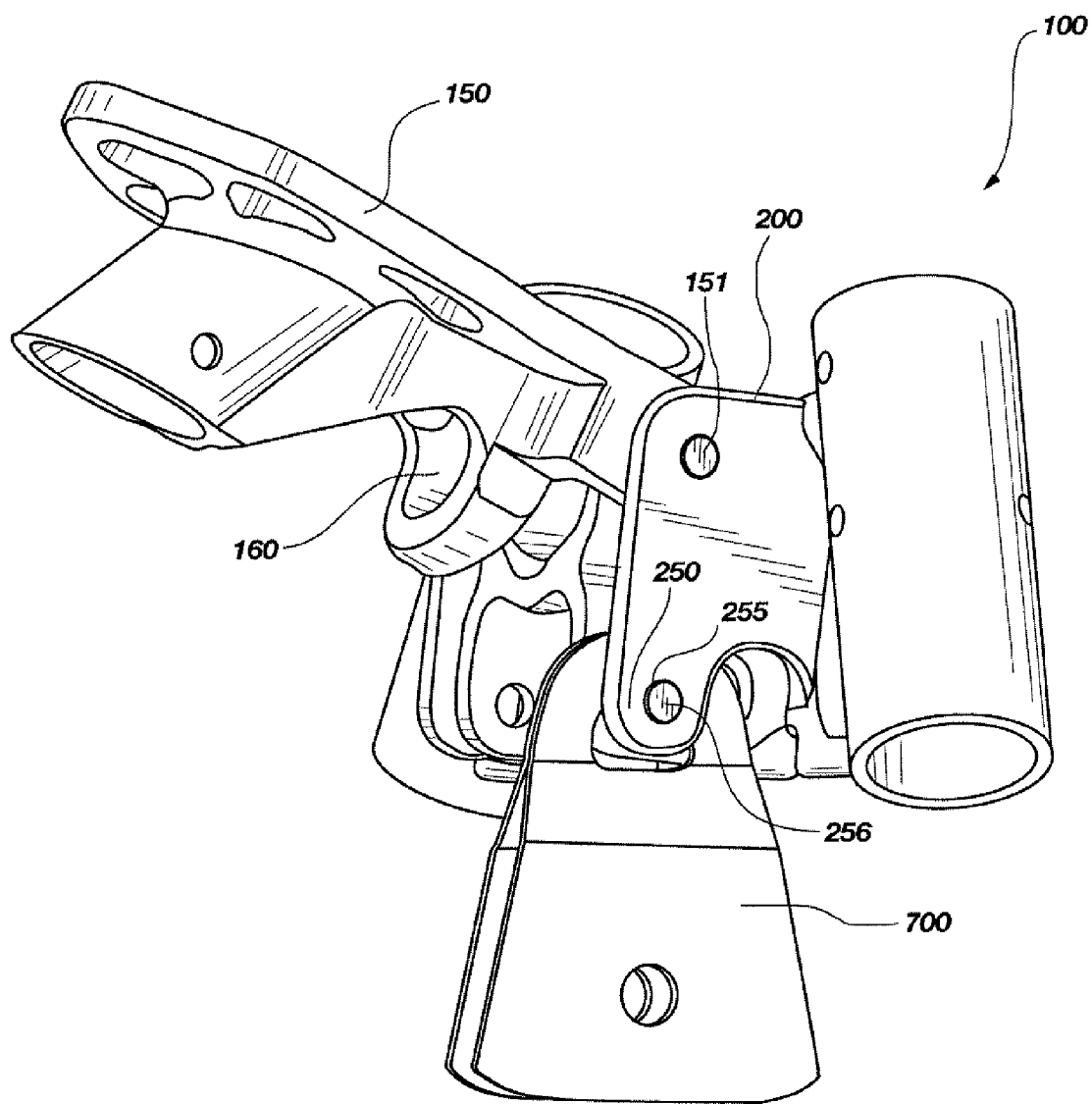
FIG. 8 illustrates the head of FIG. 2 coupled with a pulley.

FIG. 8 illustrates another feature of the present invention, direct pulley attachment. The first head component 200 may include a pair of parallel flanges 250 (also illustrated in FIG. 4). Each flange 250 has an aperture 255 therethrough. The flanges 250 may he configured to provide a support for a retaining pin 256 through apertures 255 and a pulley 700 or other device positioned therebetween. A direct attachment point for the pulley 700, (as opposed to an opening 160', 260, 260') allowing the pulley 700 to be attached with a carabiner, enables the pulley 700 to be positioned closer to the high directional head 100, and a maximum distance from the surface, such as the ground, on which the high directional is located.

FIG. 9 illustrates yet another feature of the present invention, a pulley wheel 800 rotatable about a retaining pin 256 secured through apertures 255. The retaining pin 256 may provide an axle for the pulley wheel 800. The first head component 200 of FIGS. 8 and 9 includes two pairs of flanges 250 for connection of pulleys 700 and other devices. A first head component 200 including one or more than two pairs of flanges 250 is also within the scope of the invention. A flange 250 of the pairs of flanges 250 having more than one aperture 255 therethrough is also within the scope of the invention.

Although the foregoing description contains many specifics, these are not to be construed as limiting the scope of the present invention, but merely as providing certain exemplary embodiments. Similarly, other embodiments of the invention may be devised which do not depart from the spirit or scope of the present invention. The scope of the invention is, therefore, indicated and limited only by the appended claims and their legal equivalents, rather than by the foregoing description. All additions, deletions, and modifications to the invention, as disclosed herein, which fall within the meaning and scope of the claims are encompassed by the present invention.

What is claimed is:

1. A high directional, comprising:
   an articulated head having a first head component removably coupled in a movable relationship with a second head component, the first head component comprising at least two leg connectors integrally formed with the first head component, the second head component comprising at least one additional leg connector; and
   a plurality of legs, at least two legs of the plurality of legs removably connected to the at least two leg connectors of the first head component, and at least one additional leg of the plurality of legs removably connected to the at least one additional leg connector of the second head component, wherein the first head component is movable with respect to the second head component in an axis offset from any plane comprising two or more legs of the plurality of legs.

2. The high directional of claim 1, wherein the at least two legs of the plurality of legs that are removably connected to the at least two leg connectors of the first head component are configured to be telescopically received in and axially movable through the at least two leg connectors of the first head component.

3. The high directional of claim 1, wherein the at least one additional leg of the plurality of legs is telescopically received in and axially movable through the at least one additional leg connector of the second head component.

4. The high directional of claim 1, wherein each leg of the plurality of legs comprises an upper leg segment axially movable with respect to a lower leg segment.

5. The high directional of claim 4, wherein at least one leg of the plurality of legs further comprises at least one additional lower leg segment including an inner leg portion affixed to an outer leg portion.

6. The high directional of claim 5, wherein the inner leg portion includes a locating projection and the outer leg portion includes a locating notch.

7. The high directional of claim 5, wherein the inner leg portion is affixed to the outer leg portion with an epoxy bond.

8. The high directional of claim 1, further comprising a plurality of feet, each foot of the plurality of feet respectively secured to one leg of the plurality of legs.

9. The high directional of claim 8, wherein each foot of the plurality of feet is respectively, removably secured to one leg of the plurality of legs.

10. The high directional of claim 8, wherein each foot of the plurality of feet is respectively, permanently secured to one leg of the plurality of legs.

11. The high directional of claim 8, wherein each foot of the plurality of feet comprises at least one of a round foot, a raptor foot, and a jointed foot.

12. The high directional of claim 1, wherein the articulated head includes at least one attachment point for at least one of a rope, a carabiner, and a pulley.

13. The high directional of claim 12, wherein the at least one attachment point comprises at least one aperture extending through one of the first head component and the second head component.

14. The high directional of claim 12, wherein the at least one attachment point is positioned outside all planes comprising any two legs of the plurality of legs.

15. The high directional of claim 12, wherein the at least one attachment point comprises two opposing apertures configured to receive a retaining pin therethrough, the retaining pin configured for coupling a pulley to the articulated head.

16. The high directional of claim 15, further comprising a pulley coupled to the articulated head by the retaining pin and positioned between the two opposing apertures.

17. The high directional of claim 15, further comprising a pulley wheel coupled to the articulated head by the retaining pin and rotatable about an axis extending through the two opposing apertures.

18. A high directional, comprising:
a head comprising a first head portion and a second head portion and configured for supporting an object, the first head portion comprising at least two leg connectors integrally formed with the first head portion, the second head portion comprising at least one additional leg connector; and
a plurality of legs each respectively, removably connected to a leg connector of one of the first head portion and the second head portion, each leg of the plurality of legs comprising:
an upper leg segment telescopically received in and axially adjustable with respect to a leg connector of one of the first head portion and the second head portion;
at least one lower leg segment configured for telescopically receiving the upper leg segment, wherein the upper leg segment is axially adjustable with respect to the at least one lower leg segment; and
wherein the first head portion and the second head portion are movable with respect to one another in an axis offset from any plane comprising two or more legs of the plurality of legs.

19. The high directional of claim 18, wherein the at least one lower leg segment comprises a plurality of lower leg segments, and each lower leg segment of the plurality includes an inner leg portion affixed to an outer leg portion.

20. The high directional of claim 19, wherein the inner leg portion includes a locating projection and the outer leg portion includes a locating notch.

21. The high directional of claim 19, wherein the inner leg portion is affixed to the outer leg portion with an epoxy bond.

22. A high directional, comprising:
a head for supporting an object, the head comprising a first head component and a second head component, the first head component and the second head component configured to pivot relative to one another, the first head component comprising at least two leg connectors integrally formed with the first head component, the second head component comprising at least one additional leg connector;
a retaining pin extending through at least two apertures formed in at least one of the first head component and the second head component;
a pulley mounted on and configured to rotate around the retaining pin between the at least two apertures; and
a plurality of legs, each leg of the plurality of legs respectively connected to a leg connector of one of the first head component and the second head component.

23. A high directional, comprising:
a head having a plurality of leg connectors, a first head portion comprising at least two leg connectors integrally formed with the first head portion, and a second head portion, the first head portion and the second head portion configured to move relative to one another in an axis offset from the plurality of leg connectors; and
a plurality of legs each respectively connected to a leg connector of the plurality of leg connectors, each leg of the plurality of legs having an adjustable length, the high directional having a height adjustable both by adjusting the length of at least one leg of the plurality of legs and by sliding at least one leg of the plurality of legs through a leg connector of the plurality of leg connectors.

24. A kit for a high directional, comprising:
a first head component;
a second head component configured to be coupled to and rotatable about the first head component; and
a plurality of legs, at least two legs of the plurality of legs configured to be connected to and slidable through the first head component, and at least another leg of the plurality of legs configured to be connected to and slidable through the second head component, wherein the second head component is rotatable about the first head component in an axis offset from the plurality of legs;
wherein the at least two legs are configured to be telescopically received in and axially movable through respective leg connectors integrally formed with the first head component.

25. The kit of claim 24, wherein each leg of the plurality of legs comprises:
an upper leg segment; and
at least one lower leg segment configured to telescopically accept the upper leg segment.

26. The kit of claim 24, wherein the plurality of legs further comprises a plurality of lower leg segments, each lower leg segment of the plurality including an inner leg portion affixed to an outer leg portion.

27. The kit of claim 26, wherein the inner leg portion includes a locating projection and the outer leg portion includes a locating notch.

28. The kit of claim 26, wherein the inner leg portion is affixed to the outer leg portion with an epoxy bond.

29. The kit of claim 24, further comprising a plurality of feet configured to be respectively secured to the plurality of legs.

30. The kit of claim 29, wherein the plurality of feet comprise at least one of round feet, raptor feet, and jointed feet.

31. A kit for a high directional, comprising:
a first head component;
a second head component configured to be coupled to and rotatable about the first head component; and
a plurality of legs, at least two legs of the plurality of legs configured to be connected to and slidable through the first head component, and at least another leg of the plurality of legs configured to be connected to and slidable through the second head component, wherein the second head component is rotatable about the first head component in an axis offset from the plurality of legs;
wherein the at least another leg is configured to be telescopically received in and axially movable through a leg connector integrally formed with the second head component.

32. A kit for a high directional, comprising:
a head having a plurality of leg connectors, the head having a first head portion and a second head portion movable with respect to one another in an axis offset from the plurality of leg connectors;
wherein the first head portion comprises at least two leg connectors integrally formed with the first head portion; and
a plurality of legs, each leg comprising:
an upper leg segment configured to be coupled with and movable through a leg connector of the plurality of leg connectors; and
a lower leg segment configured to be telescopically coupled with the upper leg segment; and a plurality of feet, comprising:
- at least one set of feet of the plurality of feet configured for use with a variety of surfaces, each foot configured of the at least one set of feet to be secured to a lower leg segment; and
- at least another set of feet configured for use with soft surfaces, each foot of the at least one set of feet configured to be secured to a lower leg segment.

33. A kit for a high directional, comprising:
a plurality of legs;
a first head component configured to be connected to at least one leg of the plurality of legs for use in a multipod and configured for use in a gin pole; and
a second head component configured to be coupled to the first head component and to be rotatable with respect to the first head component in an axis offset from the plurality of legs, the second head component comprising at least two leg connectors integrally formed with the second head component, each of the at least two leg connectors configured to be connected to a respective leg of the plurality of legs, the second head component further configured for use in a multipod and configured for use in an A-frame.

34. A kit for a high directional, comprising:
a head having a plurality of leg connectors each integrally formed with one of a first head portion and a second head portion, the first head portion and the second head portion being movable with respect to one another in an axis offset from any plane comprising at least two leg connectors of the plurality of leg connectors; and
a plurality of legs each configured to be connected to a leg connector of the plurality of leg connectors, each leg of the plurality of legs having an alterable length, the high directional having a height adjustable both by altering the length of at least one leg of the plurality of legs and by sliding at least one leg of the plurality of legs through a leg connector of the plurality of leg connectors.

* * * * *